United States Patent
Auf Der Heide et al.

(10) Patent No.: US 8,147,933 B2
(45) Date of Patent: **\*Apr. 3, 2012**

(54) TEXTILE FOOD CASING IMPREGNATED WITH FOOD ADDITIVE

(75) Inventors: Christian Auf Der Heide, Osnabrueck (DE); Dirk Auf Der Heide, Alfhausen (DE); Erna Kastl, Huenstetten (DE); Martina Koenig, Wiesbaden (DE); Juerg-Heinrich Kallweit, Osnabrueck (DE)

(73) Assignee: Kalle GmbH, Wiesbaden (DE)

( * ) Notice: Subject to any disclaimer, the term of this patent is extended or adjusted under 35 U.S.C. 154(b) by 1247 days.

This patent is subject to a terminal disclaimer.

(21) Appl. No.: 10/548,752

(22) PCT Filed: Mar. 29, 2004

(86) PCT No.: PCT/EP2004/003292
§ 371 (c)(1),
(2), (4) Date: Sep. 8, 2005

(87) PCT Pub. No.: WO2004/086871
PCT Pub. Date: Oct. 14, 2004

(65) Prior Publication Data
US 2006/0251773 A1    Nov. 9, 2006

(30) Foreign Application Priority Data
Mar. 31, 2003   (DE) .................................. 103 14 699

(51) Int. Cl.
*A22C 13/00*   (2006.01)
*B29D 22/00*   (2006.01)
*B29D 23/00*   (2006.01)

(52) U.S. Cl. ..................... 428/34.8; 428/36.1; 428/36.6; 428/36.3; 428/36.9; 428/36.91; 426/105; 426/135; 426/127; 426/250; 53/409; 53/431

(58) Field of Classification Search ................. 428/34.8, 428/36.1, 36.6, 36.3, 36.9, 36.91; 426/105, 426/135, 127, 250; 53/409, 431
See application file for complete search history.

(56) References Cited

U.S. PATENT DOCUMENTS

| | | |
|---|---|---|
| 5,955,126 A | 9/1999 | Jon et al. |
| 6,200,613 B1 * | 3/2001 | Schafer et al. ................ 426/105 |

FOREIGN PATENT DOCUMENTS

| | | |
|---|---|---|
| DE | 23 30 774 A | 9/1974 |
| DE | 37 04 563 A1 | 8/1988 |
| DE | 39 30 834 A1 | 3/1991 |
| DE | 41 23 745 A1 | 1/1993 |
| DE | 295 11 713 U1 | 9/1995 |
| DE | 200 16 992 A1 | 11/2001 |
| EP | 0408164 A2 * | 1/1991 |
| EP | 0 986 957 A1 | 3/2000 |
| EP | 0 995 194 A1 | 4/2000 |
| JP | H2-69131 A | 8/1990 |
| JP | 2000139401 A | 5/2000 |
| WO | WO 98/31731 A1 | 7/1998 |

\* cited by examiner

*Primary Examiner* — Michael C Miggins
(74) *Attorney, Agent, or Firm* — ProPat, L.L.C.

(57) ABSTRACT

The invention relates to a tubular food wrapping made of an absorbent material that is imbibed with colorants and/or flavorings which can be transferred to a food item placed in the wrapping. The inventive food wrapping consists of a textile envelope, preferably comprising a longitudinal seam. Also disclosed are a method for producing said wrapping and the use thereof.

25 Claims, No Drawings

TEXTILE FOOD CASING IMPREGNATED WITH FOOD ADDITIVE

CROSS REFERENCE TO RELATED APPLICATIONS

This application claims priority to German parent Application No. 103 14 699.7. Both the parent application and corresponding PCT application PCT/EP 2004/003292 are hereby incorporated by reference herein in their entirety.

FIELD OF THE INVENTION

The invention relates to a tubular food casing which comprises a material which can absorb dyes and/or aroma substances which can then be transferred to a food situated in the casing. The invention further relates to a method for producing the casing and use thereof.

BACKGROUND OF THE INVENTION

Food casings, especially artificial sausage casings which comprise substances which can be transferred to the food or the sausage meat emulsion are already known. For instance, WO 98/31731 and EP-A 986 957 disclose films which, on the side facing the food, have a layer which comprises a flavor or aroma component and also a polysaccharide or protein as binder. The support layer of the films consists of polyolefin, polyamide, polyester, poly(vinylidene chloride) (PVDC), poly(vinyl chloride) (PVC) or polystyrene.

JP-A 139401/2000 describes a film by which food color can be transferred to sausage meat emulsion, ham or similar foods. This is achieved by a coating which, in addition to the food dye, also contains an edible plasticizer, such as glycerol, sorbitol or propylene glycol.

EP-A 992 194 (=DE-A 198 46 305) relates to a barrier casing made of a synthetic material, the casing being coated on the inside with a layer of an absorbent material which is impregnated with dyes or aroma substances (woven fabric, knitwear or knitted fabric). During cooking or scalding, the dyes or aroma substances are transferred to the food enclosed by the casing. The inner layer is bonded to the adjacent layer of the casing generally by an adhesive. The barrier casing itself consists, for example, of polyamide and polyethylene layers. It is generally produced from a corresponding flat film by heat sealing or gluing, and ensures mechanical stability. A great disadvantage of this casing is that it cannot be taken off completely, i.e. parts of the inner layer remain on the food. The reason is considered to be an insufficiently mechanically stable bond between the plastic material and the textile inner layer.

Cellulose-based tubular food casings are already described which, on the side facing the food, carry smoke aroma and/or spices. These casings have a high permeability to water vapor and oxygen. A food situated in the casing therefore dries out relatively quickly and can only be kept for a short time.

All the known casings having inner layers or inner coatings which comprise a transferrable food additive usually have the disadvantage that either their production is technically very complex, that they cannot transfer the food additives in a sufficient amount, or that they are in part difficult to remove.

SUMMARY OF ADVANTAGEOUS EMBODIMENTS OF THE INVENTION

Starting from EP-A 992 194 as the closest prior art, the object was to provide a casing having transferrable dyes and/or aroma substances which can be produced simply,
can absorb a sufficient amount of dyes, aroma substances and/or flavorings and can transfer them to a food situated in the casing,
can be completely removed from the food without delamination,
has an oxygen and water vapor permeability which can be set in a defined manner and
can be used for cooked-meat emulsion, scalded-emulsion or raw sausage sausages.

The object is achieved by a textile casing which directly stores the dyes, aroma substances and/or flavorings and can release them to a food situated therein. In contrast to that in said EP-A, the textile material simultaneously ensures the mechanical stability of the casing.

DETAILED DESCRIPTION OF ADVANTAGEOUS EMBODIMENTS OF THE INVENTION

The present invention therefore relates to a tubular food casing which comprises a material which can absorb dyes, aroma substances and/or flavorings which can then be transferred to a food situated in the casing, wherein the food casing is a textile casing. In a preferred embodiment, the textile casing has a longitudinal seam.

The textile casing can be produced from a woven, loop-formingly knitted, laid-scrim or batt fabric or spunbonded fabric or in some other way from a textile base material. It can consist of natural fibers, such as cotton, linen, silk or wool, of modified natural fibers, such as viscose staple fibers, of synthetic fibers, such as polyester fibers or polyamide fibers or of any mixtures thereof. It is similarly of importance that it can absorb, store and release again the respective dyes, aroma substances and/or flavorings. The textile base material generally has a weight per unit area of 25 to 150 g/m$^2$, preferably of 50 to 110 g/m$^2$.

Dyes, aroma substances and/or flavorings can have a liquid consistency. The abovementioned material is therefore preferably absorbent, so that it can be impregnated with the dyes, aroma substances and/or flavorings. However, it can alternatively have a solid consistency. Preference is given to liquid smoke, grill aroma, spices or spice extracts (for example pepper, coriander, curry or paprika or paprika flavor), cinnamon, caramel, fruit aromas, marinades or the like. It can in addition have a preserving action on the food. This applies in particular to liquid smoke. In addition, a plurality of solid and/or liquid substances can be combined with one another.

If appropriate, the dyes, aroma substances and/or flavorings are furthermore combined with a binder or a binder mixture. The binder is, for example, a protein or a polysaccharide. Suitable binders are, in particular, cellulose derivatives, in particular ethers or esters of cellulose, such as carboxymethylcellulose (CMC), hydroxymethylcellulose, hydroxypropylcellulose, hydroxypropylmethylcellulose, alginic acid and/or alginate, chitosan, pectin, carrageenan or starch or starch derivatives, and also proteins, such as albumin, casein, zein, wheat protein, soybean protein or pea protein. The binder is selected in accordance with the type of the textile base material of the casing and the type of dye, aroma substance and/or flavoring. Using these substances, in addition, the adhesion and separation properties of the casing to the respective food can be modified in a targeted manner. The adhesion is generally to be strong enough so that the casing during ripening or storage does not detach, and on the other hand must be weak enough so that it can be taken off without problems without food constituents remaining adhered.

Dyes, aroma substances and/or spices and binders can be applied simultaneously, if appropriate in the form of a mixture, or else in succession.

Because of its high water vapor permeability, the inventive casing is particularly suitable for producing raw sausage. However, it can also be used for producing cooked-meat emulsion or scalded-emulsion sausage. In these cases it should in addition have at least one outer coating which effectively decreases the water vapor permeability and oxygen permeability. It comprises, for example, an acrylic resin and/or a poly(vinylidene chloride) (PVDC) resin. A casing which is coated with acrylic resin alone has the advantage that it is already smokable. Suitable polymers for a water vapor barrier layer are generally polymers which have units of at least one of the following monomers: acrylates, methacrylates, vinyl acetate, vinyl alcohol, ethylene, butadiene, styrene, acrylic acid, methacrylic acid, acrylamide and/or acrylonitrile. On preparation of the outer coating, the amount applied is selected in such a manner that the textile structure of the casing is still recognizable. The coating therefore generally has (after drying) a weight of up to 150 g/m$^2$. In the raw sausage application, the layer weight is preferably up to 30 g/m$^2$, in the scalded-emulsion and cooked-meat emulsion sausage application 30 to 150 g/m$^2$. The polymer coatings therefore essentially only fill the gaps in the textile base material. In this embodiment also the casing is therefore of a single layer, so that no delamination problems can occur. The inventive casing without such an outer coating or with a water vapor permeable coating generally has a water vapor permeability of greater than 150 g/m$^2 \cdot$d, preferably 300 to 800 g/m$^2 \cdot$d, particularly preferably 400 to 500 g/m$^2 \cdot$d. In the coated embodiment for cooked-meat emulsion and scalded-emulsion sausage, the water vapor permeability is generally up to 150 g/m$^2 \cdot$d, preferably up to 100 g/m$^2 \cdot$d, and for high barrier requirements, up to 5 g/m$^2 \cdot$d. By means of the additional coating, in addition, the printability of the inventive food casing can be improved. In the case of a casing which is provided for raw sausage, this effect can be achieved by appropriately permeable coatings.

The inventive casing is produced by methods which are familiar to those skilled in the art. The starting material used is generally a textile flat sheeting. If appropriate, the flat sheeting is provided on one side with at least one layer which acts as water vapor barrier and/or oxygen barrier. The textile character should remain recognizable even after a coating. The coating is therefore to be chosen appropriately thin. Expediently, the coating material only fills the interstitial spaces between the textile fibers. The intended dyes, aroma substances and/or flavorings are applied to this flat sheeting. Depending on their viscosity, this can be achieved, for example, by spraying, printing, dipping or by applying using a scraper knife. Granular or piece-form food additives (peppercorns, coarsely ground pepper or the like) are generally scattered on. In this case, expediently, a binder layer is applied in advance and/or the granular or piece-form food additives are combined before the application with a binder or binder mixture. The dyes, aroma substances and/or flavorings can also be applied in a predetermined manner, e.g. in a predetermined pattern (e.g. in strips running vertically, in parallel or inclined to the sheeting direction).

The textile flat sheeting impregnated with the food additive is then, where required, trimmed to the appropriate width, shaped to form a tube, for example using a forming shoulder, and then fixed with a seam. The seam itself can be produced by sewing, gluing, sealing tape welding or by another joining method.

Alternatively to this, the sheet-like textile material, coated if appropriate, can, where required after being cut to the appropriate width, be formed to a tube which is then fixed with a longitudinal seam by one of the abovementioned methods. The casing, however, is glued "left-handed", so that any coating possibly present is situated on the inside. The casing is then treated with the dyes, aroma substances and/or flavorings. It can be passed, for example, through an impregnation vat which is filled with a liquid smoke composition, or another aqueous composition. Where necessary, the casing is then dried, for example using hot air. It is then inverted, so that the dyes, aroma substances and/or flavorings pass to the inside, and can later be transferred. In a modification of the method, right-hand glued casings are impregnated or wetted on the inside with the dyes, aroma substances and/or flavorings using a liquid bulb which is passed through into the interior.

In a further embodiment, a seamless textile casing is used such as can be, for example, produced using a circular knitting machine. Depending on the intended use, the seamless casing can be coated on the outside, for example by a barrier layer. The dye, aroma substance and/or flavoring is coated on the inside of the casing for example using the already described liquid bulb.

The tubular food casing can be finally processed in a conventional manner. It can, for example, be shirred in sections to form sticks, or processed to from sections which are closed (generally tied) at one end.

The decisive advantage of the invention casing compared with the known casing having a plastic layer and an internal textile layer is that it is single-layered, so that the described delamination problems are eliminated. When the casing is taken off, therefore no textile residues remain on the sausage meat emulsion. The inventive casing can be used not only as artificial sausage casing for raw sausage, scalded-emulsion sausage and cooked-meat emulsion sausage, but also for encasing cheese. The cheese or its surface can be refined in such a manner.

The examples hereinafter serve to illustrate the invention. Percentages herein are percentages by weight, where not stated otherwise, or obvious from the context.

EXAMPLE 1

Cooked-Meat Emulsion Sausage Casing

On a sheet-like textile material made of cotton fabric having a width of about 100 cm and a weight of 100 g/m$^2$, an acrylic layer was first applied using a doctor knife. The acrylic layer, after drying at 150° C., had a weight of 50 g/m$^2$. Then, a barrier layer made of a PVDC dispersion was further applied to the acrylic layer. The barrier layer had, after drying, a weight of 10 g/m$^2$.

The coated textile material was then trimmed so as to produce sheeting, from which, after overlapping the longitudinal edges, a tubular casing having a diameter of 54 mm (=caliber 54) was produced. The casing was glued left-handed, so that the barrier layer and the acrylic layer were situated on the inside. The glue used was a polyurethane glue.

The casing was then passed through an immersion bath where it was charged with a liquid smoke composition. The composition comprises:

| | |
|---|---|
| 68% | liquid smoke having a pH of about 7 (obtainable from Zesti Smoke), |
| 30% | water, |

-continued

| | |
|---|---|
| 1.0% | alginate, |
| 0.9% | silica and |
| 0.1% | citral |

The coated casing then passed through a drying section. It was then inverted and stacked up to form a stick.

It was then stuffed with cooked-meat sausage emulsion, portioned and the ends of the individual sausages closed with metal clips. The cooking process was then performed at 75° C. (core temperature in the interior of the sausage: 72° C.) for the period of about 65 min. After cooling, the casing was peeled off. The cooked-meat sausage emulsion exhibited the desired uniform smoked rim and intensive smoked flavor.

EXAMPLE 2

Scalded-Emulsion Sausage Casing

Example 1 was repeated with the exception that the immersion bath had the following composition:

| | |
|---|---|
| 20% | curry spice powder, |
| 2% | alginate, |
| 2% | starch, |
| 1% | shellac (20% strength dissolved in 1M NaOH) and |
| 75% | water |

The casing was then inverted as described above and stuffed with poultry-ham sausage meat emulsion. The sausage was then scalded (78° C., 70 min) and cooled. After taking off the casing, the surface of the sausage meat emulsion exhibited a uniform curry rim.

EXAMPLE 3

Raw Sausage Casing

On a sheet-like textile material made of cotton fabric having a width of about 100 cm and a weight of 100 g/m², using a doctor knife, an acrylic layer was applied which, after drying at 150° C., had a weight of 30 g/m². The coated textile material was then cut to size so as to produce sheets from which, after overlapping the longitudinal edges, a tubular casing having a diameter of 54 mm was produced. The casing was glued left-handed, so that the acrylic layer was situated on the inside. The glue used was a polyurethane glue.

The casing was then passed through an immersion bath where it was charged with a liquid smoke composition which comprised 82% of an acidic liquid smoke (obtainable from Red Arrow Corp.), 15% of an acidic liquid smoke "Enviro Gold'n'Brown (Red Arrow Corp.) and 3% glycerol.

The casing was dried, inverted and stacked up to form a stick. It was filled with raw sausage emulsion and ripened for 21 days at 24° C. initially and 16° C. at the end of the 21 days, and about 92% relative humidity at the start of the 21 days, and about 75% relative humidity at the end of the 21 days. After peeling off the casing, the sausage emulsion had the desired intense smoked flavor.

The invention claimed is:

1. A tubular food casing consisting of (i) textile material, (ii) dyes, aroma substances and/or flavorings and, optionally, (iii) at least one outer coating,
   wherein said textile material can absorb said dyes, aroma substances and/or flavorings, and said dye, aroma substances and/or flavorings can then be transferred to a food situated in the casing, and the textile material has a weight per unit area of 50 to 150 g/m².

2. The food casing as claimed in claim 1, wherein the food casing comprises a longitudinal seam.

3. The food casing as claimed in claim 1, wherein the material is impregnated with dyes, aroma substances and/or flavorings.

4. The food casing as claimed in claim 1, wherein the textile material consists of natural fibers, linen, silk, wool, of modified natural fibers, of synthetic fibers, or of mixtures of these fibers.

5. The food casing as claimed in claim 1, wherein the food casing has a weight per unit area of 50 to 300 g/m².

6. The food casing as claimed in claim 1, wherein the dye, aroma substance and/or flavoring is a liquid smoke, a grill aroma, a spice, a spice extract, coriander, curry, paprika, paprika flavor, cinnamon, caramel, a fruit aroma or a marinade.

7. The food casing as claimed in claim 1, wherein the casing for raw sausage applications has a water vapor permeability of greater than 150 g/m²·d.

8. The food casing as claimed in claim 1, wherein the longitudinal seam is produced by sewing, gluing, and/or by sealing tape welding.

9. Cased raw sausage, scalded-emulsion sausage, cooked-meat emulsion sausage or packaged cheese comprising the food casing as claimed in claim 1.

10. The food casing as claimed in claim 1, wherein said dyes, aroma substances and/or flavorings are liquid.

11. The food casing as claimed in claim 1, wherein the dye, aroma substance and/or flavoring is combined into a mixture with a binder or a binder mixture.

12. The food casing as claimed in claim 11, wherein the binder comprises a protein, casein, zein, wheat protein, soybean protein, pea protein, a polysaccharide or a derivative thereof, alginic acid and/or alginate, chitosan, pectin, carrageenan, starch or starch derivatives.

13. The food casing as claimed in claim 1, wherein the food casing has at least one outer coating.

14. The food casing as claimed in claim 13, wherein the outer coating is a water vapor barrier and/or oxygen barrier.

15. The food casing as claimed in claim 14, wherein the outer coating is a one- or two-layer coating comprising an acrylic resin and/or a polyvinylidene chloride resin.

16. The food casing as claimed in claim 15, wherein the outer coating resin has units of at least one of the following monomers: acrylates, methacrylates, vinyl acetate, vinyl alcohol, ethylene, butadiene, styrene, acrylic acid, methacrylic acid, acrylamide and/or acrylonitrile.

17. The food casing as claimed in claim 13, wherein the coating after drying has a weight of 0 to 150 g/m².

18. A tubular food casing as claimed in claim 13, wherein (i) the food casing is a raw sausage casing and the outer coating has a layer weight after drying of up to 30 g/m² or (ii) the food casing is a scalded-emulsion or cooked-meat emulsion sausage casing and the outer coating has a layer weight after drying of 30 to 150 g/m².

19. The food casing as claimed in claim 13, wherein a water vapor permeability for scalded-emulsion sausage applications and cooked-meat emulsion sausage applications of up to 150 g/m²·d has been imparted via one or more outer coatings alone.

20. A method for producing a food casing as claimed in claim 1, which comprises
   (i) preparing a sheet-like textile flat material,
   (ii) optionally providing the flat material on one side with at least one layer which acts as a water vapor barrier and/or oxygen barrier,
   (iii) applying to the side of the flat material opposite the optional barrier layer at least one dye, aroma substance and/or flavoring,
   (iv) optionally trimming the flat material to the correct width,
   (v) shaping the flat material to form a tube having overlapping longitudinal edges, the at least one dye, aroma substance and/or flavoring being situated on the inside of the tube, and
   (vi) fixing the overlapping edges by a seam.

21. The method as claimed in claim 20, wherein the dye, aroma substance and/or flavoring is a solid food additive which, before the application, is combined with a binder or a binder mixture.

22. A method for producing a food casing as claimed in claim 1, which comprises
   (i) preparing a sheet-like textile flat material,
   (ii) optionally providing the flat material on one side with at least one layer which acts as a water vapor barrier and/or oxygen barrier,
   (iii) shaping the optionally coated flat material to form a tube having overlapping longitudinal edges, the layer acting as water vapor barrier and/or oxygen barrier being situated on the inside of the tube,
   (iv) fixing the overlapping longitudinal edges by a seam,
   (v) applying to the outside of the tube at least one dye, aroma substance and/or flavoring and
   (vi) inverting the tube.

23. A tubular food casing comprising textile material formed from fibers, said textile material ensuring the mechanical stability of said casing and further absorbing dyes, aroma substances and/or flavorings, wherein said dye, aroma substances and/or flavorings can then be transferred to a food situated in the casing and the textile material has a weight per unit area of 50 to 150 g/m²,
   said food casing comprising an outer coating that essentially only fills the interstitial spaces between the fibers,
   wherein said casing can be completely removed from the food without delamination, said food casing (i) forming a single layer, (ii) said textile material having a textile structure selected from woven, knitted, laid-scrim, batt or spunbonded, and (iii) said casing further comprising said coating applied in an amount to allow said textile structure to be recognized within the coated casing.

24. A shirrable tubular food casing consisting of (i) textile material providing mechanical stability to said casing, (ii) an impregnation comprising dyes, aroma substances and/or flavorings and, optionally, (iii) barrier consisting of at least one outer barrier coating formed from an acrylic resin and/or a polyvinylidene chloride resin,
   wherein said textile material can absorb said dyes, aroma substances and/or flavorings, and said dye, aroma substances and/or flavorings can then be transferred to a food situated in the casing.

25. A food casing as claimed in claim 24, wherein the textile material has a weight per unit area of 50 to 110 g/m².

* * * * *